US011318501B1

(12) United States Patent
De La Rosa et al.

(10) Patent No.: US 11,318,501 B1
(45) Date of Patent: May 3, 2022

(54) MESH FLAPS FOR CONTAINER CAPACITY DETECTION IN SORTATION SYSTEMS

(71) Applicant: Amazon Technologies, Inc., Seattle, WA (US)

(72) Inventors: Jose Luis De La Rosa, Seattle, WA (US); Larry Joe Robb, Walton, FL (US); Eli Douglas Girod, Seattle, WA (US); Mohammad Mosa, Seattle, WA (US); Justin Stone, Frisco, TX (US); Roland J. Menassa, Renton, WA (US); Robert Thomas Brown, Fairwood, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 174 days.

(21) Appl. No.: 16/875,353

(22) Filed: May 15, 2020

(51) Int. Cl.
*B07C 5/36* (2006.01)
*B07C 5/34* (2006.01)
*B25J 9/16* (2006.01)

(52) U.S. Cl.
CPC ............ *B07C 5/362* (2013.01); *B07C 5/3404* (2013.01); *B25J 9/1697* (2013.01); *B07C 2501/0063* (2013.01)

(58) Field of Classification Search
CPC ................ B07C 5/362; B07C 5/3404; B07C 2501/0063; B25J 9/1697; B25J 19/021; B25J 19/022; B25J 19/023; B25J 9/1694; B25J 9/0093; B25J 9/0096; G07F 11/02; G07F 11/04; G07F 11/28; B65G 1/1373
USPC ......................................................... 209/552
See application file for complete search history.

(56) References Cited

U.S. PATENT DOCUMENTS

| | | | | |
|---|---|---|---|---|
| 2,273,814 | A * | 2/1942 | Bartel | G07F 11/02 221/130 |
| 9,505,554 | B1 * | 11/2016 | Kong | G06T 7/254 |
| 10,007,827 | B2 * | 6/2018 | Wagner | B25J 19/023 |
| 2016/0244262 | A1 * | 8/2016 | O'Brien | G06Q 10/087 |
| 2019/0051090 | A1 * | 2/2019 | Goldberg | B60P 3/0257 |
| 2019/0094017 | A1 * | 3/2019 | Wakabayashi | B25J 9/1697 |
| 2019/0366553 | A1 * | 12/2019 | Simkins | B25J 9/1697 |

* cited by examiner

*Primary Examiner* — Gene O Crawford
*Assistant Examiner* — Muhammad Awais
(74) *Attorney, Agent, or Firm* — Eversheds Sutherland (US) LLP

(57) ABSTRACT

Systems, methods, and computer-readable media are disclosed for mesh flaps for container capacity detection in sortation systems. In one embodiment, an example system for use with an item sortation machine may include a rotatable flap comprising a mesh grid coupled to a frame, where the rotatable flap is disposed adjacent to a container of items in the item sortation machine, and a sensor disposed adjacent to the rotatable flap, where the sensor is configured to sense an item protruding out of the container. The mesh grid may have a set of metallic wires that intersect to form the mesh grid, where the set of metallic wires form a geometric pattern.

20 Claims, 8 Drawing Sheets

MESH FLAPS FOR CONTAINER CAPACITY DETECTION IN SORTATION SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
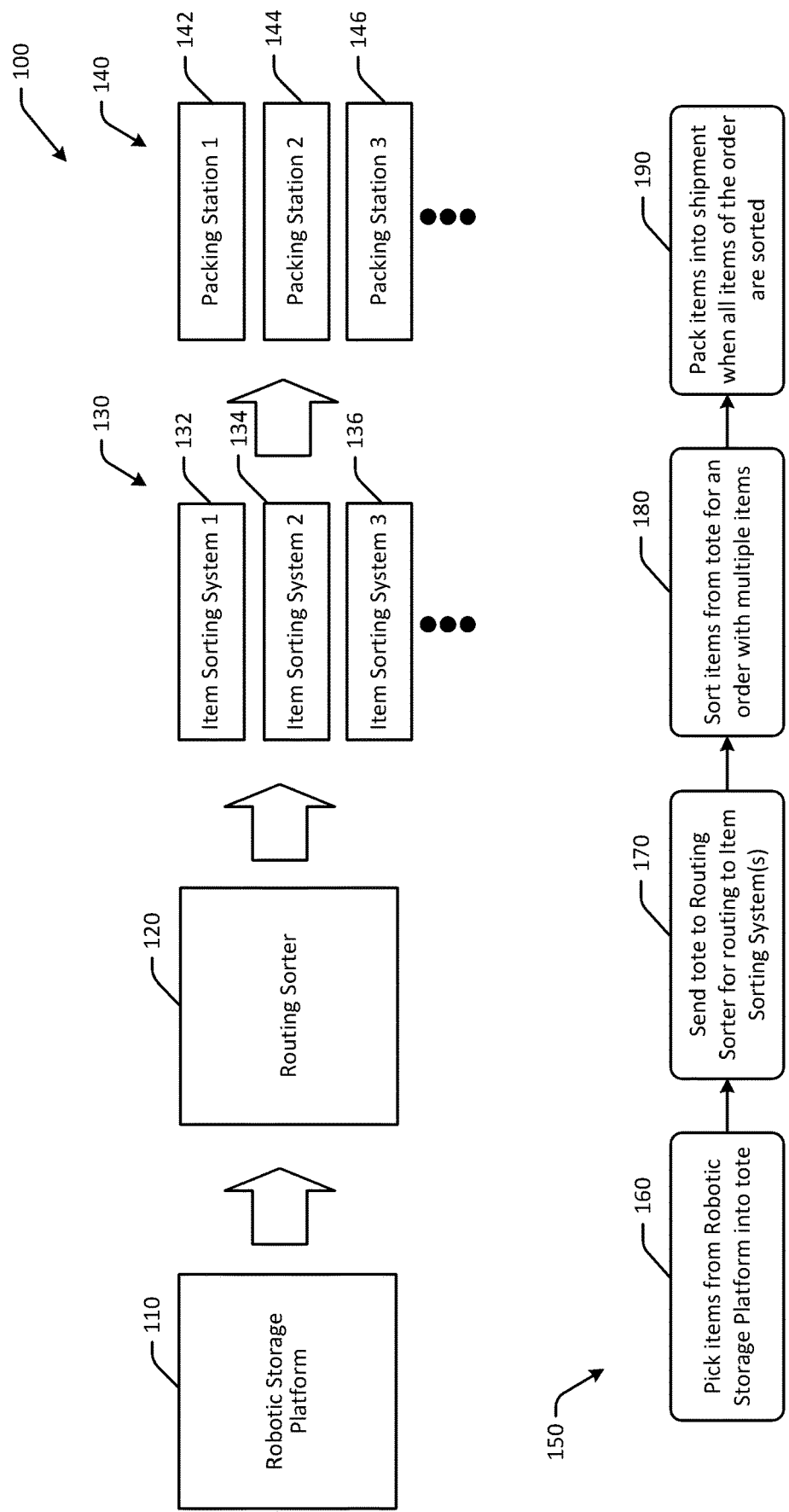
FIG. 1 is a hybrid schematic illustration of an example use case for mesh flaps for container capacity detection in sortation systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center. However, determining the capacity of containers may be difficult in instances where visibility into containers for humans or using sensors is obstructed. For example, flaps or other components may be used for a variety of purposes, such as preventing items from falling out of a tote or other container, but such flaps may obstruct visibility into the container for a user to manually visualize the contents of the container and gauge capacity, and/or for a sensor system, such as Lidar sensors or other reflective light measurement sensors, a camera system, a laser system, etc. to determine a remaining capacity for a particular container.

Embodiments of the disclosure include methods and systems for automated item sorting that may improve processing and fulfillment of single and multi-item orders, or orders that include more than one item. Certain embodiments include mesh flaps for container capacity detection of containers in sortation systems, which may allow for automated determination of container capacity, as well as facilitate manual visualization of container capacity that may otherwise be obstructed by other flaps or components. Some embodiments may create a faraday cage effect about an item sortation system, which may improve wireless communication performance of components within the item sortation system, and may also facilitate reduced distancing requirements between adjacent item sortation systems, resulting in a reduced footprint of a fulfillment center and/or item sortation system space requirements as the item sortation systems can be positioned closer together with a reduced risk of wireless communication interference both internally with respect to individual item sortation machines and externally for other wireless communications. Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Certain embodiments may include mesh flaps for item sortation systems that are configured to process items. In one example, an item sortation system may process items weighing up to twenty pounds or more. The items may be transported within the item sortation system using shuttles that may have onboard conveyors, and may be configured to travel vertically and horizontally inside the item sortation system to transport items to destinations, such as a predetermined container, distributed throughout the item sortation system. During normal operation, items may be unintentionally ejected from containers, chutes leading to containers, or other locations due to a tote or other container being too full and/or item ejection speed. Items that are ejected risk impacting human operators or equipment. To prevent items from being ejected unintentionally, embodiments of the disclosure include mesh flaps that not only prevent unintentional item ejection, but also provide visibility into the container. As a result, not only can a human operator visualize the contents of a container without risk of item ejection, but automated systems, such as Lidar sensor systems, can be used to determine container capacity and reliably sense objects on the other side of the mesh flap inside the container. Some embodiments may include mesh flaps with a one inch by one inch metallic mesh constructed using 4 millimeter diameter metallic wire. Other embodiments may include wires of different materials, such as plastic, metal, composite materials, or other materials.

Referring to FIG. 1, an example use case 100 for mesh flaps for container capacity detection in sortation systems and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
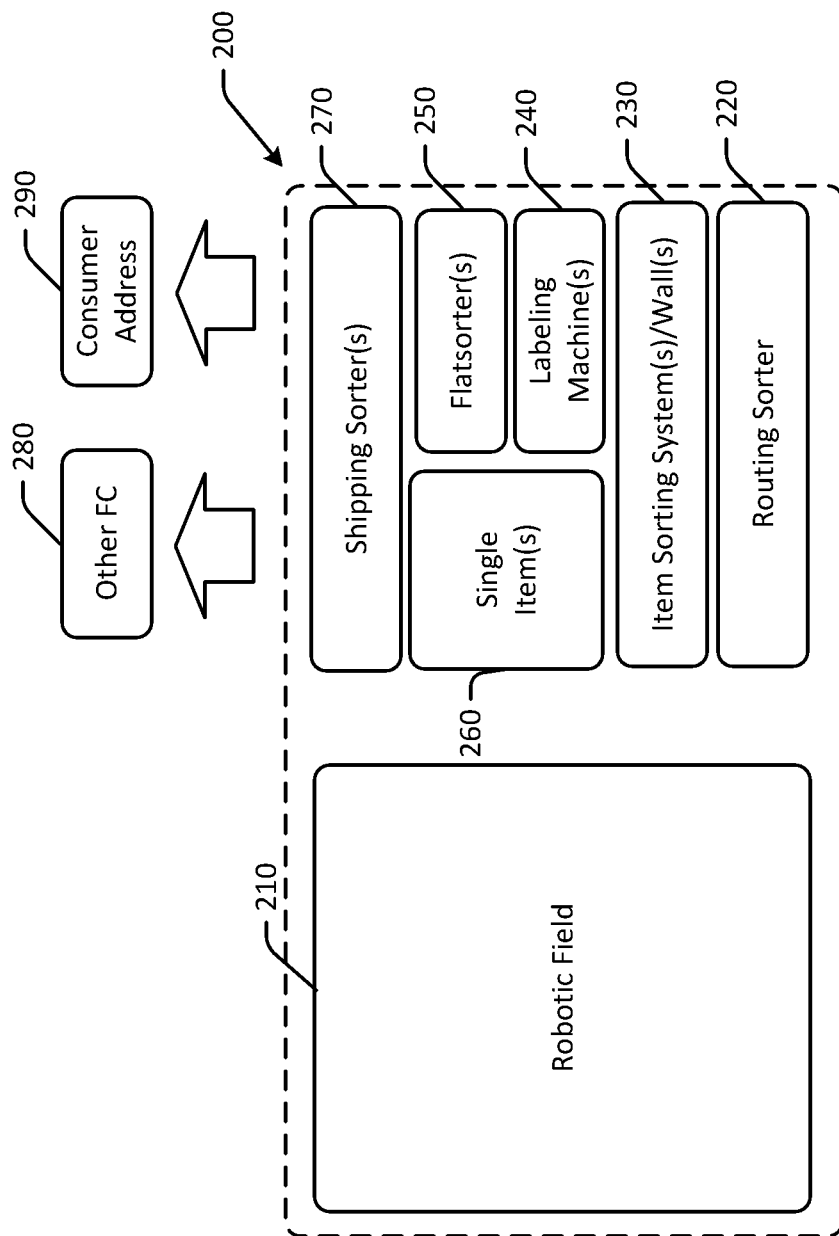
FIG. 2 is a hybrid schematic illustration of an example use case for mesh flaps for container capacity detection in sortation systems in accordance with one or more embodiments of the disclosure.

FIG. 2 is a hybrid schematic illustration of an example use case for mesh flaps for container capacity detection in sortation systems in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. For example, manual induction of products from a tote to a sorter machine may be a bottleneck that is avoided by the systems and methods described herein. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"× 14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 290, and so forth.

Accordingly, in some embodiments, item sorting systems may be arranged in rows and may receive assigned totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include mesh flaps for container capacity detection in sortation systems. The mesh flaps may prevent item ejection from containers and may also facilitate automated determination of container capacity, while at the same time reducing wireless communication interference for item sortation systems and adjacent machines. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
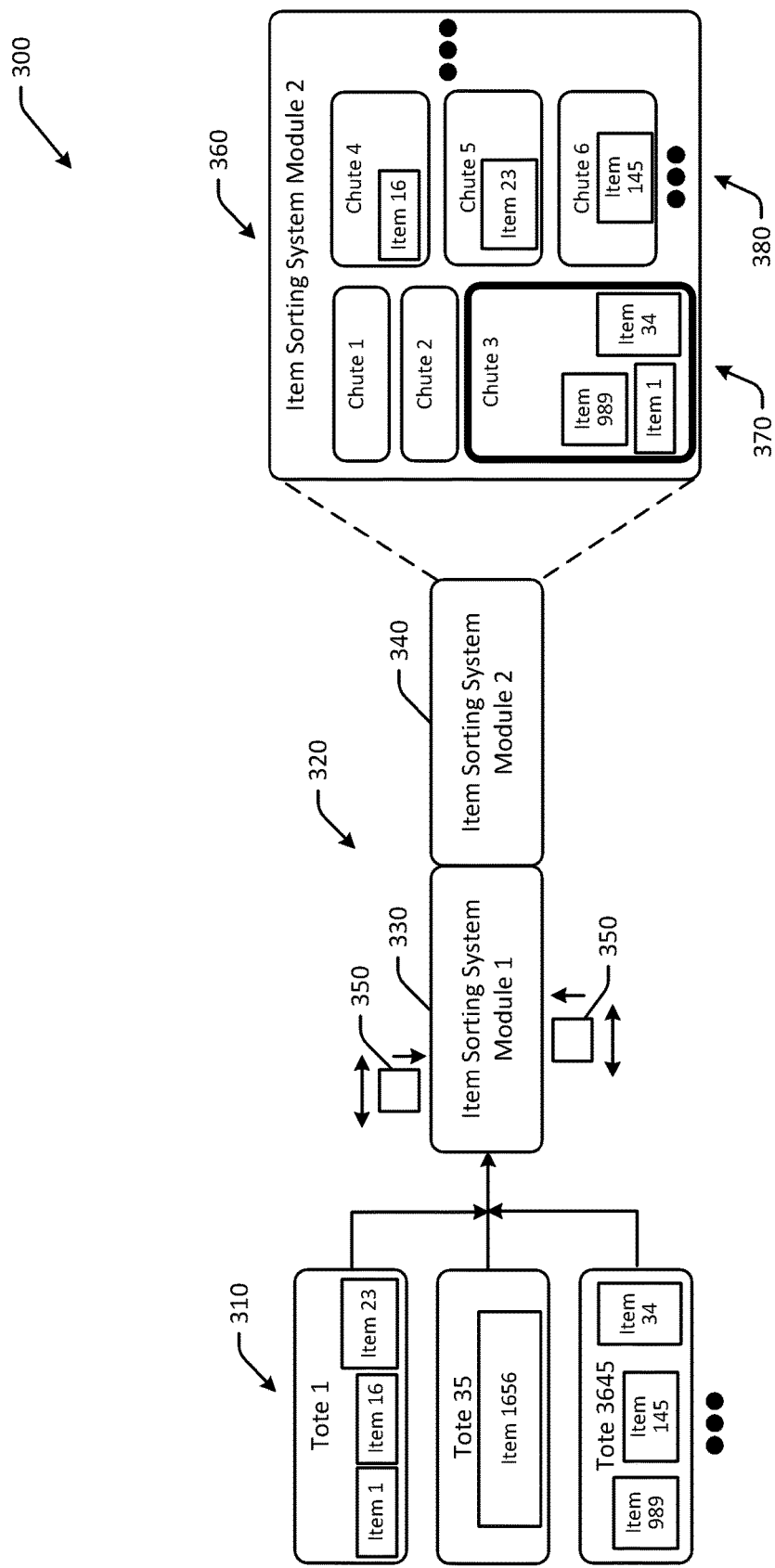
FIG. 3 is a schematic illustration of an item sorting system and additional components in accordance with one or more embodiments of the disclosure.

FIG. 3 is a schematic illustration of an item sorting system and additional components in accordance with one or more embodiments of the disclosure. Other embodiments may include additional or fewer components. The illustration of FIG. 3 is not to scale, and may not be illustrated to scale with respect to other figures. The item sorting system illustrated in FIG. 3 may be the same item sorting system discussed with respect to FIGS. 1-2.

In FIG. 3, an example use case 300 including a set of totes 310 and an item sorting system, or a multi-module item sorting machine 320, is depicted. The set of totes 310 may include one or more totes that may optionally be assigned to, or otherwise routed to, the item sorting system 320. For example, Tote 1, Tote 35, Tote 3645, and so forth may be routed to the item sorting system 320. The totes may have identifiers, such as alphanumeric or other identifiers. The totes may be used to place items that have been picked into the totes. The items that are placed in the totes may be associated with orders that are to be consolidated by the item sorting system 320, or may be items that are to be transferred to a different fulfillment center. For example, Tote 1 may include item 1, item 16, and item 23, Tote 35 may include item 1656, Tote 3645 may include item 989, item 145, and item 34, and so forth. The item sorting system, or the item sorting machines 320, may be configured to receive items from a tote that includes one or more, such as multiple items, and the tote may be assigned to, or otherwise routed to, the item sorting system or the item sorting machine 320.

The totes 310 may be directed to the item sorting system 320 for sorting and consolidation. For example, items in the totes 310 may be inducted into the item sorting system 320 via a conveyor belt.

The item sorting system machine 320 may include one or more modules, and may be adjusted in size by adding or removing modules as needed. For example, the item sorting system 320 may include a first modular item sorting machine 330 and a second modular item sorting machine 340. The second modular item sorting machine 340 may be coupled to the first modular item sorting machine 330.

The first modular item sorting machine 330 may include a first support disposed on a first side of the first modular item sorting machine 330, and a second support disposed on the first side of the first modular item sorting machine 330. One or more chutes may be coupled to one or more sides of the first modular item sorting machine 330 and/or the second modular item sorting machine 340. The first modular item sorting machine 330 may include a first chute positioned at a first location, and a second chute positioned at a second location. The first chute and the second chute may have the same dimensions or different dimensions. In some embodiments, containers or chutes may be disposed about more than one side of the first modular item sorting machine 330.

The second modular item sorting machine 340 may include a third support disposed on the first side of the second modular item sorting machine 340, and a fourth support disposed on the first side of the second modular item sorting machine 340. One or more chutes may be coupled to one or more sides of the second modular item sorting machine 340. The second modular item sorting machine 340 may include a third chute positioned at a first location, and a fourth chute positioned at a second location. The third chute and the fourth chute may have the same dimensions or different dimensions, and may have different dimensions than the first chute and/or the second chute. The first chute, the second chute, the third chute, and/or the fourth chute can be rearranged in different vertical or horizontal locations and/or coupled to different containers, and may be configured to receive packages, items of orders comprising multiple items, or other items. In some embodiments, containers and corresponding chutes may be disposed about more than one side of the second modular item sorting machine 340.

The respective modules of the item sorting system machine 320 may include one or more chutes that hold multiple items. For example, as illustrated in side view 360, the second modular item sorting machine 340 may include a first set of chutes 370, and a second set of chutes 380. The item sorting system machine 320 may include a plurality of chutes disposed in an array or other arrangement along one or more sides of the first modular item sorting machine 330 and the second modular item sorting machine 340. In FIG. 3, Chute 1 and Chute 2 may have the same dimensions, while Chute 3 in the same column may have a different dimension. Any suitable number of chute may be included.

Items or packages inducted (e.g., from the totes 310, from a conveyor belt, etc.) may be sorted and directed to a chute associated with the item or package. The items may be transported by one or more shuttles 350, which may move in one or more directions within the item sorting system machine 320. In some embodiments, the shuttles 350 may be positioned outside of the item sorting system machine 320.

For example, Item 1 may be inducted from Tote 1 and placed in Chute 3, along with Item 989 and Item 34 from Tote 3645. Chute 3 may be associated with an order that included those three items, and may therefore be ready for packing. Similarly, Item 16 may be routed to Chute 4, Item 23 may be routed to Chute 5, Item 145 may be routed to Chute 6, and so forth. Any number of chutes, containers, totes, and/or modules may be included.

Figure 4:
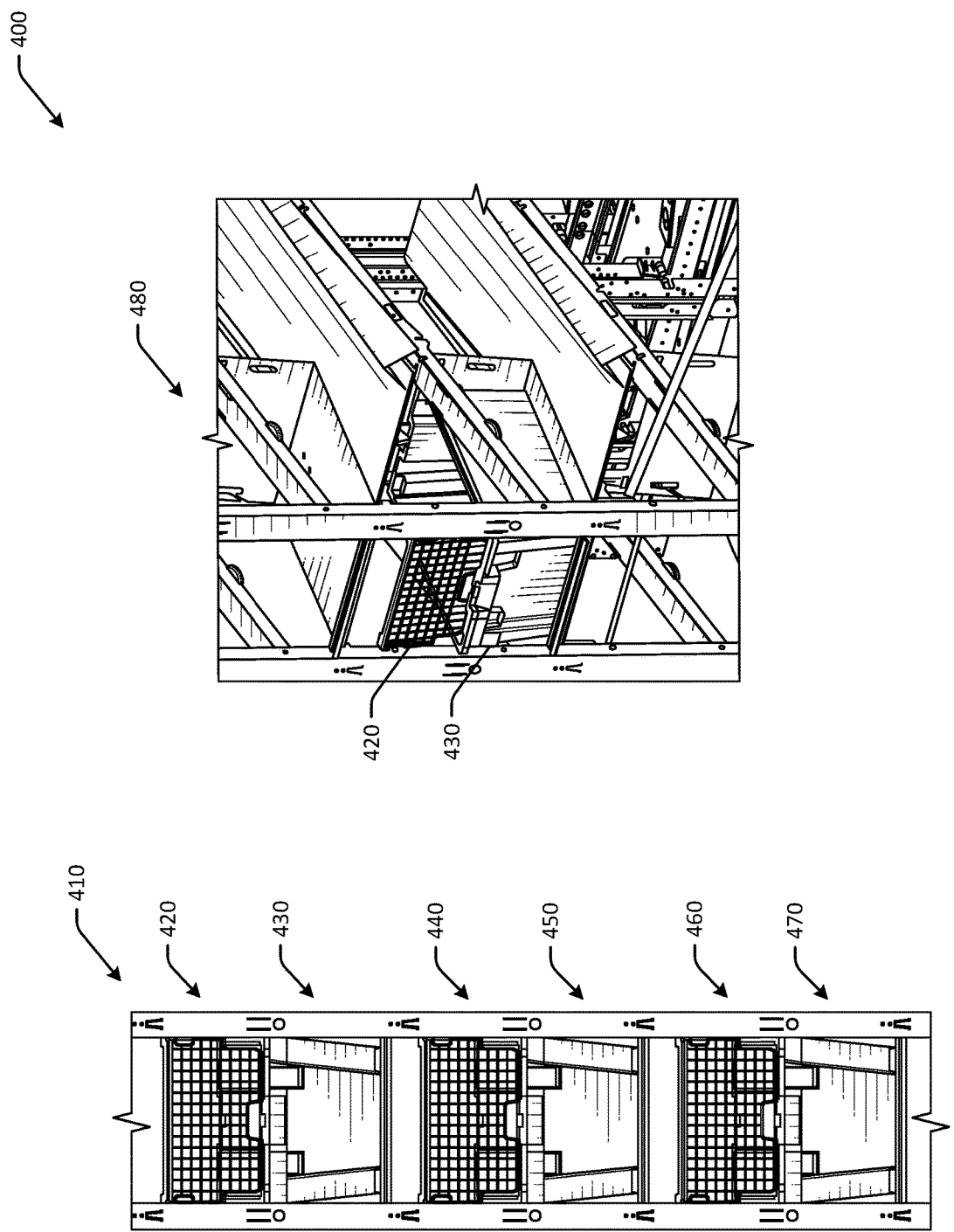
FIG. 4 is a schematic illustration of an example sortation system with mesh flaps for container capacity detection in accordance with one or more embodiments of the disclosure.

FIG. 4 is a schematic illustration of an example sortation system 400 with mesh flaps for container capacity detection in accordance with one or more embodiments of the disclosure. Other embodiments may include additional or fewer components. The illustration of FIG. 4 may not be to scale, and may not be illustrated to scale with respect to other figures. The item sorting system illustrated in FIG. 4 may be the same item sorting system discussed with respect to FIGS. 1-3.

In FIG. 4, the item sortation system 400 is depicted in a front view 410. A detail perspective view 480 of a single container and corresponding mesh flap is also depicted in FIG. 4. The item sortation system 400 may include a number of containers arranged in a column. For example, the item sortation system 400 may include a first container 430, such as a first tote, a first bag, or another type of container, a second container 450, a third container 470, and so forth. Any number of containers may be arranged in a column. The containers may be configured to receive items. For example, some or all of the containers may be disposed adjacent to chutes. Shuttles may deposit items destined for a particular container into a corresponding chute. The item may move down the chute and into the corresponding container.

Some or all of the containers may be disposed adjacent to corresponding mesh flaps. The respective mesh flaps may provide more than one functionality. For example, the mesh flaps may prevent items from coming down the chute and accidentally ejecting from the container (e.g., round items may roll down the chute and bounce out of the container, etc.). The mesh flaps may also facilitate visibility into the container to determine how full the container is, or a container capacity. The mesh flaps may also create a faraday cage effect so as to prevent electromagnetic interference with respect to wireless communications within the item sortation system 400.

The item sortation system 400 may therefore include a first mesh flap 420 that corresponds to the first container 430, a second mesh flap 440 may correspond to the second container 450, a third mesh flap 460 may correspond to the third container 470, and so forth. Accordingly, the respective mesh flaps may not only prevent items from ejecting from the respective containers, but may also facilitate visualization of container contents and/or determination of container capacity.

To facilitate visualization of container contents and/or determination of container capacity, the respective mesh flaps may include a mesh grid disposed in a frame, where a human can see through the mesh grid, or a sensor, such as a Lidar sensor, can be used to determine container capacity through the mesh grid (e.g., without having to move the mesh flap, etc.).

As depicted in the detail perspective view 480 in FIG. 4, which shows the first mesh flap 420 and the first container 430 in slots of the item sortation system 400 in isolation, the first mesh flap 420 may be disposed adjacent to a front end of the first container 430, and may be vertically elevated. For example, a bottom of the mesh flap 420 may be separated from a top of the first container 430 by a small clearance, such as less than 1 inch. The first mesh flap 420 may rotate inwards or outwards, and may be configured to translate in a vertical direction to provide clearance when moving the first container 430. For example, the first mesh flap 420, or any of the other mesh flaps, may be coupled to a frame of the item sortation system 400 that allows for the respective mesh flaps to slide vertically, so as to create clearance for removal and/or replacement of a container without having to rotate the mesh flap inwards or outwards.

The item sortation system 400 may therefore include a first container having a first set of items, the first container configured to receive the first set of items via a first chute, a second container having a second set of items, the second container configured to receive the second set of items via a second chute, and so forth. Any number of containers may be included, and may be arranged in any suitable formation.

In FIG. 4, the first mesh flap 420 may be a first rotatable flap that is coupled to a frame of the item sortation system 400 and disposed adjacent to a top of the first container 430. The first rotatable flap may be configured to rotate towards and/or away from the item sortation system 400 to facilitate removal of the first container 430 from the item sortation system 400. The first rotatable flap may have a first mesh grid formed of round metallic wires. Other embodiments may have non-round wires, such as wires with octagonal or other non-round outer geometries (e.g., multi-faceted outer geometries, etc.). Additional rotatable flaps may be coupled to the frame of the item sortation system 400 and disposed adjacent to tops of additional containers.

The first container 430 or any of the other containers may be removed from the item sortation system 400 when full or when a certain threshold amount of capacity remains or is full. For example, containers may be removed from the item sortation system 400 when the container is 50% capacity is full, 60% capacity is full, 70% capacity is full, 80% capacity is full, 90% capacity is full, 100% capacity is full, or at another threshold. In another example, containers may be removed from the item sortation system 400 when 50% capacity remains, 60% capacity remains, 70% capacity remains, 80% capacity remains, 90% capacity remains, 100% capacity remains, and so forth. When a container is removed, it may be replaced with an empty container. Containers may be removed manually or automatically.

Container capacity detection may be used to determine when a container is full and/or is otherwise to be replaced. Container capacity detection may be performed automatically or manually, such as by an operator visualizing container contents through the mesh flaps. In another example, in some embodiments, a robotic manipulator, such as a robotic arm, a gantry, or other automated component may be configured to move from the first container to the second container, and so forth. A Lidar sensor or other sensor, such as a camera, a depth sensor, a three-dimensional sensor, a laser, a radar, a combination thereof, or a different type of sensor may be coupled to the robotic arm or other component, and may be used to determine whether or not a particular container is full. Due to the mesh flaps, the Lidar sensor or other sensors may be able to detect container capacity without moving the mesh flaps. In some embodiments, the sensors may be configured to sense an item protruding out of the first container 430 in order to determine whether the container is full.

In an embodiment, the item sortation system and/or a separate computer system in communication with a sensor system may be configured to determine container capacity and/or whether a container is full or is otherwise to be replaced. For example, a computer system or a controller may be configured to determine, using data from a Lidar sensor or other sensor system, that a first item is protruding out of the first container 430. The Lidar sensor may be coupled to a robotic arm, a gantry robot, or a different automated component that may allow for movement of the Lidar sensor to read container capacities of different containers. The controller may cause the first container to be automatically removed from the item sortation system and transported to a shaking table for settling of the first item. For example, because an item was protruding from the container, the container may be automatically transported to a shaking table or other surface for shaking of the container to cause settlement of the items in the container. In one example, a robotic arm may transport the container from the item sortation system 400 to the shaking table or other surface. The container may again be checked to determine whether an item is protruding, and if not, may be sent downstream for further processing. If so, the shaking table process may be repeated. For containers that do not have items protruding from a top of the container, the controller may determine, using data from the Lidar sensor, that an item is not protruding out of the second container, and may cause the second container to be automatically removed from the item sortation system 400 and transported to a downstream processing station.

In some embodiments, an indication of the Lidar sensor feedback or the corresponding determination as to whether a container is full may be sent or otherwise provided to a downstream processing station to trigger additional operations, such as removal of a container, replacement of a container, transport of a container to a shaking table, etc.

Figure 5:
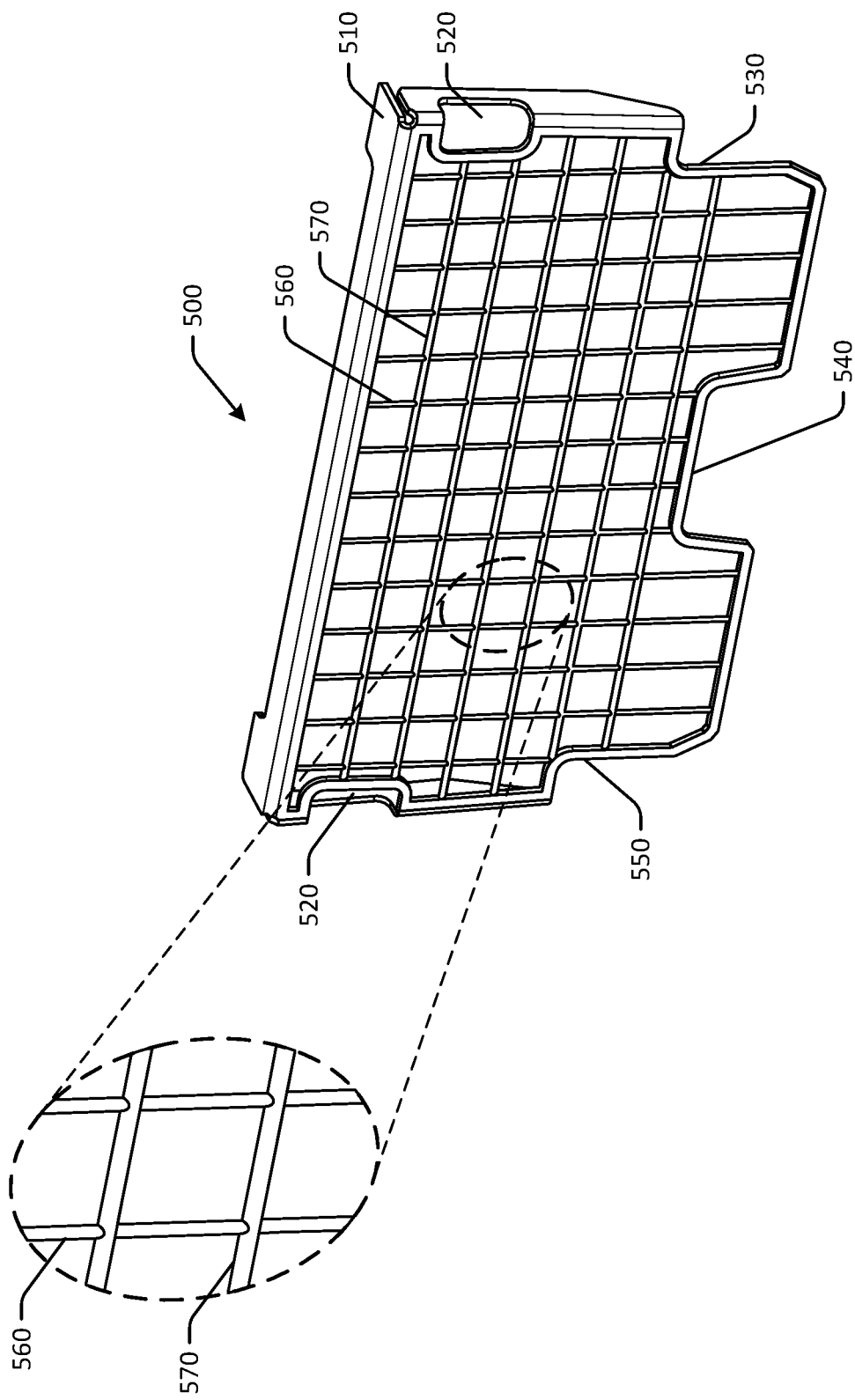
FIG. 5 is a schematic illustration of a perspective view and detail view of a mesh flap in accordance with one or more embodiments of the disclosure.

FIG. 5 is a schematic illustration of a perspective view and detail view of a mesh flap 500 in accordance with one or more embodiments of the disclosure. Other embodiments may include additional or fewer components. The illustration of FIG. 5 may not be to scale, and may not be illustrated to scale with respect to other figures. The mesh flap illustrated in FIG. 5 may be the same mesh flap discussed with respect to FIGS. 1-4.

The mesh flap 500 may include a frame 510 that may be formed of plastic, metal, a composite material, or a different type of material. The frame 510 may be disposed about a perimeter of the mesh flap 500. The frame 510, in some embodiments, may include a number of cutout portions to facilitate movement of the mesh flap 500, such as during replacement of a full container with an empty container. For example, a first cutout 530 may be disposed along a first side at a lower end of the mesh flap 500, and may facilitate moving of the frame by grasping its first side (e.g., right hand side in the example of FIG. 5, etc.). A second cutout 540 may be disposed along a middle lower end of the mesh flap 500, and may facilitate moving of the frame by grasping it at the bottom. A third cutout 550 may be disposed along a second side at a lower end of the mesh flap 500, and may facilitate moving of the frame by grasping its second side (e.g., left hand side in the example of FIG. 5, etc.). A pair of fourth cutouts 520 may be configured to allow the mesh flap 500 to slide vertically with respect to a frame of the item sortation machine. For example, the fourth cutouts 520 may be slots disposed at upper ends of the mesh flap 500 that can be used to facilitate rotation and/or sliding of the mesh flap 500 relative to a frame of the item sortation system.

A number of wires may be coupled to the frame 510. In some embodiments, such as that illustrated with respect to FIG. 5, the wires may form a mesh grid that forms one inch by one inch squares. Other embodiments may form different grid patterns, or may not form grids and instead may be parallel (e.g., there may not be transverse wires, etc.). Some embodiments may have different dimensions, such as 0.5" by 0.5" or 0.25" by 0.25" square grids. The wires may be rounded wires having a diameter of between about 2 millimeters to about 5 millimeters in some embodiments. The wires may be metallic wires.

In the example of FIG. 5, the wires may include a first wire 560 disposed along a vertical axis or longitudinal axis of the frame 510. Any number of wires may be disposed in the frame parallel to the first wire 560. The wires may include a second wire 570 disposed along a horizontal or latitudinal axis of the frame 510 and may be disposed perpendicular to the first wire 560. In other embodiments, the respective wires may be disposed transverse to each other. In yet other embodiments, the respective wires may all be aligned and/or may not intersect. In the illustrated embodiment, the wires that form the mesh grid form a pattern of squares having a width of about one inch. The wires may optionally be round metallic wires having a diameter of about 4 millimeters.

The mesh flap 500 may be part of a system for use with an item sortation machine. For example, the system may include a rotatable flap, such as the mesh flap 500, having a mesh grid coupled to the frame 510, where the frame 510 is a metallic frame. Other embodiments may have frames of different materials, such as plastic, metal, composite materials, or a different type of material. The rotatable flap may be disposed adjacent to a container of items in the item sortation machine. The system may include a Lidar sensor disposed adjacent to the rotatable flap, where the Lidar sensor is configured to sense an item protruding out of the container. The mesh grid may have a set of metallic wires that intersect to form the mesh grid, and where the set of metallic wires may optionally form a geometric pattern, such as a grid, a linear pattern, a random pattern or a different type of pattern. The set of metallic wires may include individual metallic wires having a diameter between about 3 millimeters and about 5 millimeters in some embodiments. The rotatable flap may be configured to slide in a vertical direction relative to the container to which it is adjacent.

Figure 6:
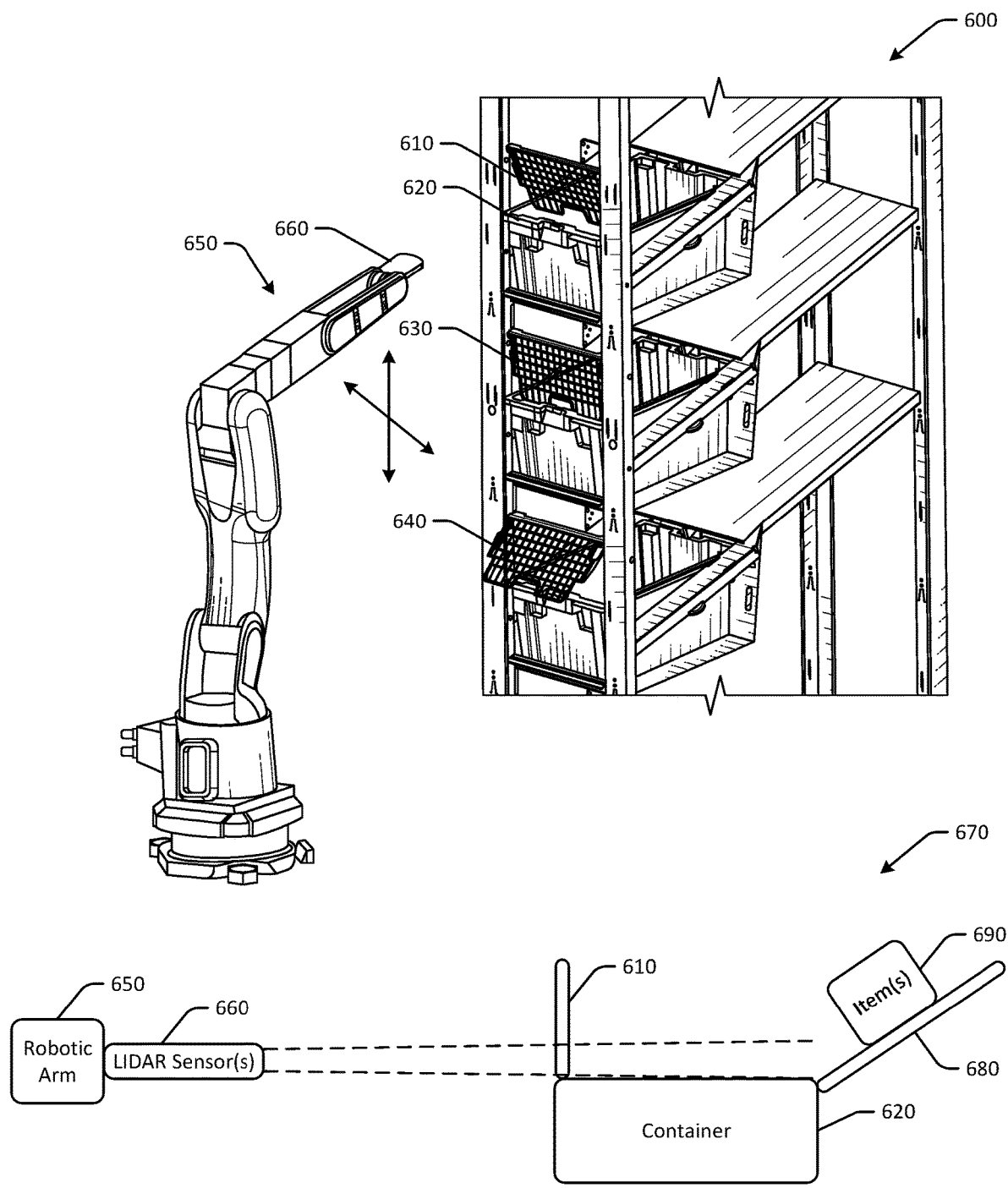
FIG. 6 is a schematic illustration of a sortation system with mesh flaps for container capacity detection and a Lidar sensor system in accordance with one or more embodiments of the disclosure.

FIG. 6 is a schematic illustration of a sortation system 600 with mesh flaps for container capacity detection and a Lidar sensor system in accordance with one or more embodiments of the disclosure. Other embodiments may include additional or fewer components. The illustration of FIG. 6 may not be to scale, and may not be illustrated to scale with respect to other figures. The item sorting system illustrated in FIG. 6 may be the same universal item sorter discussed with respect to FIGS. 1-5.

In FIG. 6, the sortation system 600 may include a number of containers and corresponding mesh flaps. For example, the sortation system 600 may include a first mesh flap 510 adjacent to a first container 620, a second mesh flap 630 adjacent to a second container, a third mesh flap 640 adjacent to a third container, and so forth. A Lidar sensor 660 or other type of sensor may be used to determine capacity of the containers through the respective mesh flaps. In the illustrated embodiment, the Lidar sensor 660 is coupled to a robotic arm 650 and is configured to move from a first location to a second location along horizontal, vertical, and lateral axes (e.g., along X-, Y-, and Z-axes, etc.).

As illustrated in schematic side view 670, the Lidar sensor 660 may be aligned with a top of the first container 620 via movement of the robotic arm 650. The Lidar sensor 660 may emit light that passes through the first mesh flap 610, and the Lidar sensor may determine whether the first container 620 is full without moving the first mesh flap 610. Items 690 may be deposited into the first container 620 via a chute 680. The first mesh flap 610 may prevent the items 690 from ejecting out of the first container 620. The mesh flaps of the sortation system 600 may form a faraday shield that prevents electromagnetic interference with the item sortation machine.

Figure 7:
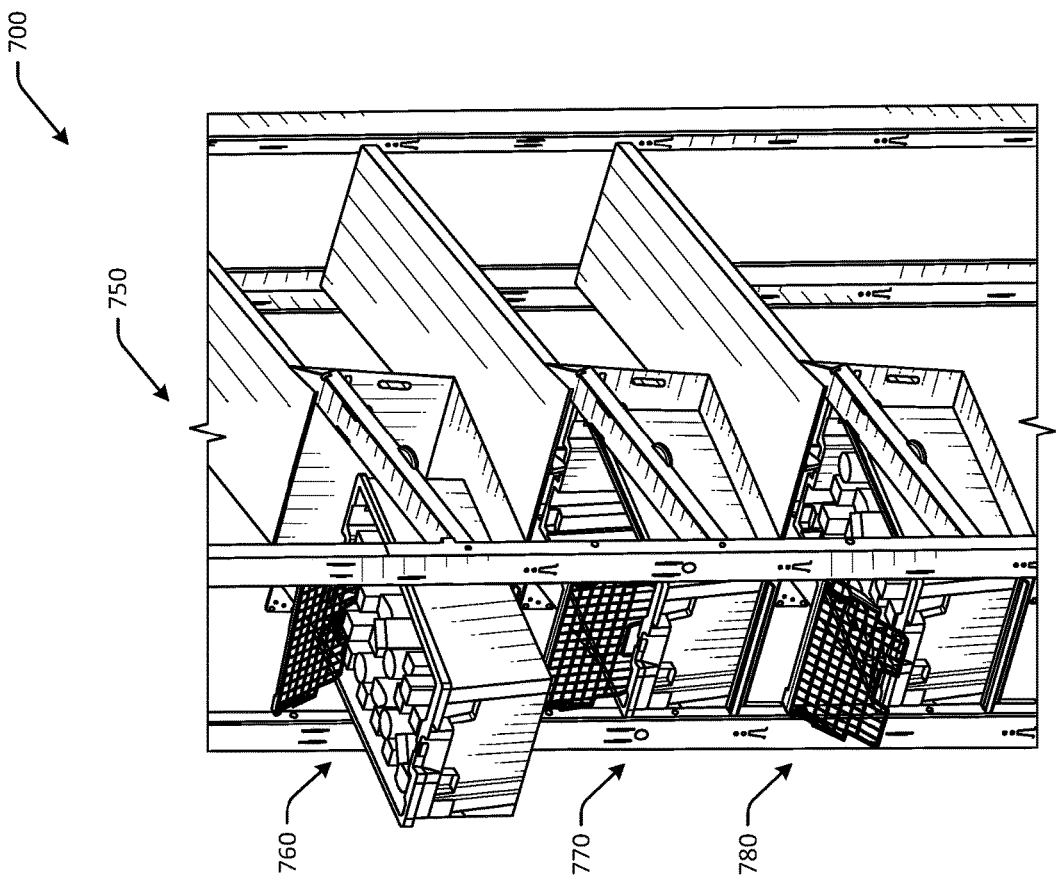
FIG. 7 is a schematic illustration of a sortation system with mesh flaps for container capacity detection in different rotational states in accordance with one or more embodiments of the disclosure.
Figure 7:
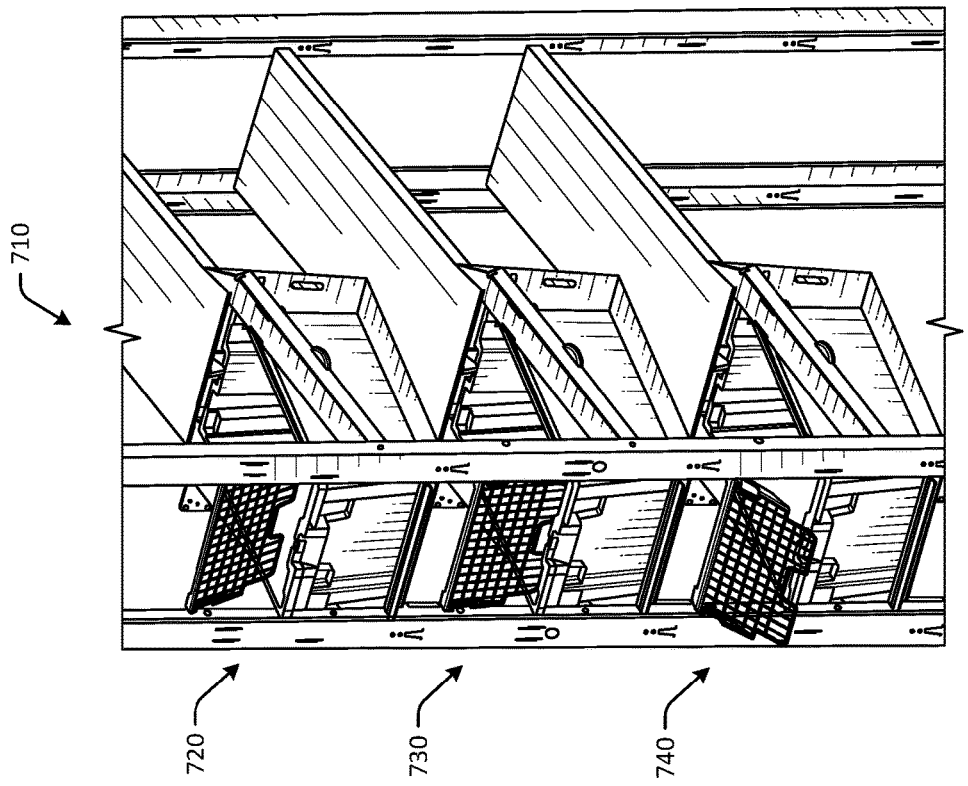

FIG. 7 is a schematic illustration of a sortation system 700 with mesh flaps for container capacity detection in different rotational states in accordance with one or more embodiments of the disclosure. Other embodiments may include additional or fewer components. The illustration of FIG. 7 may not be to scale, and may not be illustrated to scale with respect to other figures. The vertical damping assembly illustrated in FIG. 7 may be the same item sortation system discussed with respect to FIGS. 1-6.

In FIG. 7, at a first instance 710, a set of containers may be arranged in a column of the item sortation system 700. As items are sorted, the items may be deposited into the containers. For example, an empty first container 720 may be empty and may receive items via a first chute, an empty second container 730 may be empty and may receive items via a second chute, an empty third container 740 may be empty and may receive items via a third chute, and so forth. The respective containers may be empty at the first instance 710.

As items are deposited into the respective containers, the containers may periodically be checked for capacity and/or fullness. For example, a Lidar sensor coupled to a robotic arm or other component may be used to periodically determine capacity of the respective containers. For example, the Lidar sensor or other sensor system may be disposed adjacent to a top of a container, and a line scanning operation may be performed to determine whether any items are protruding from a top of the container. The Lidar sensor or other sensor system may be operable without moving the respective mesh flaps disposed adjacent to a top end of the containers.

At a second instance 750, a full first container 760 may be determined to be full and may therefore be removed from the item sortation system 700 and replaced with an empty container. The mesh flap may optionally be rotated towards the item sortation system 700 to facilitate removal of the full first container 760. The second container may be partially full 770 and may remain at the item sortation system 700, and the third container may be partially full 780 and may remain at the item sortation system 700. As depicted in FIG. 7, the third mesh flap may rotate outwards to facilitate removal of the third container, as well as to prevent items from ejecting from the container during sortation.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
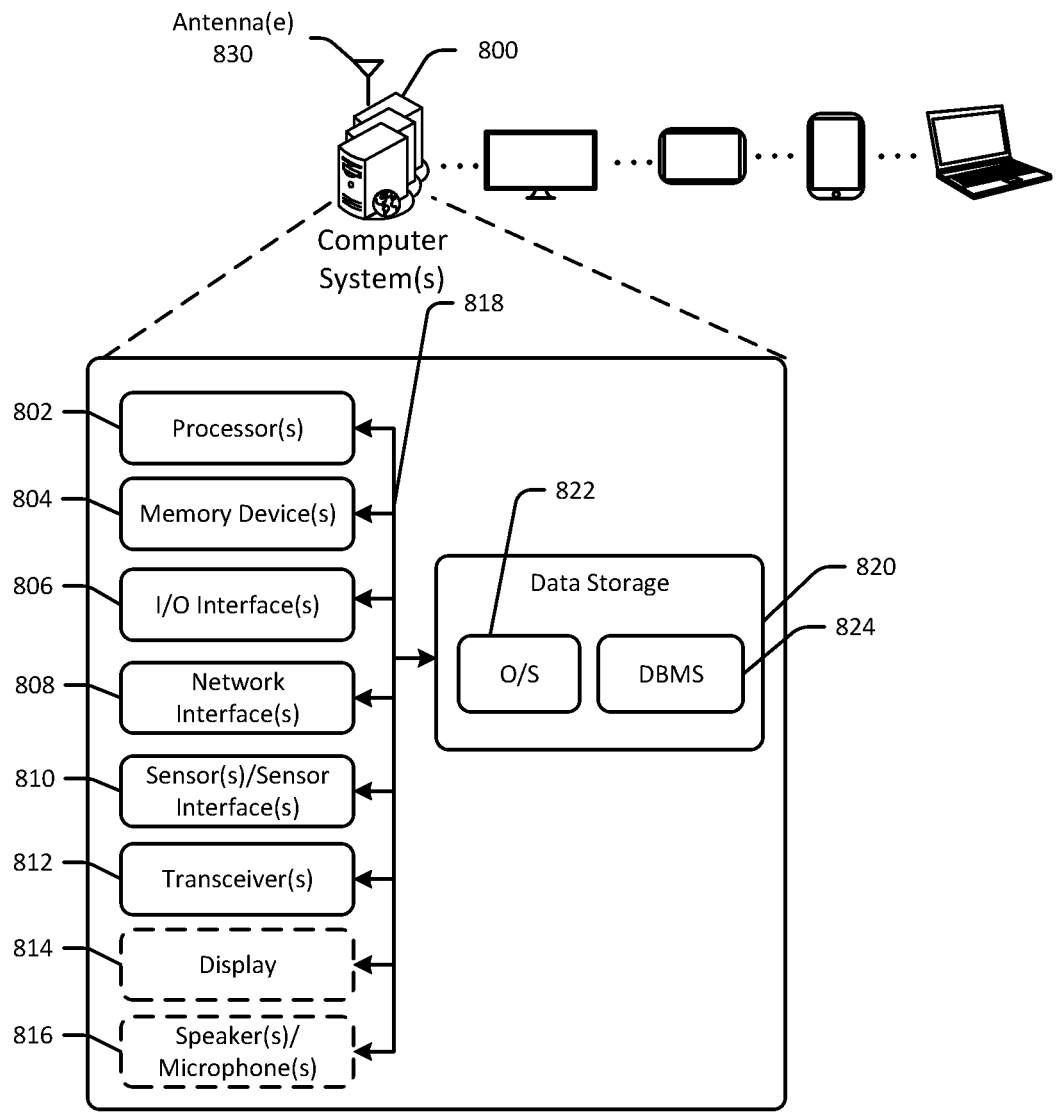
FIG. 8 schematically illustrates an example architecture of a computer system associated with an item sorting system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with any one of the system(s) of FIGS. 1-7.

The computer system(s) 800 may be configured to communicate with one or more servers, user devices, or the like. The computer system(s) 800 may be configured to cause the sortation system(s) to deposit items into one or more chutes, retrieve containers, determine container capacity, determining Lidar or other sensor measurements, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may,"

unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An item sortation system comprising:
   a first container comprising a first set of items, the first container configured to receive the first set of items via a first chute;
   a second container comprising a second set of items, the second container configured to receive the second set of items via a second chute;
   a first rotatable flap coupled to a frame of the item sortation machine and disposed adjacent to a top of the first container, wherein the first rotatable flap is configured to rotate towards the item sortation machine to facilitate removal of the first container from the item sortation machine, the first rotatable flap comprising a first mesh grid formed of round metallic wires;
   a second rotatable flap coupled to the frame of the item sortation machine and disposed adjacent to a top of the second container, wherein the second rotatable flap is configured to rotate towards the item sortation machine to facilitate removal of the second container from the item sortation machine, the second rotatable flap comprising a second mesh grid formed of round metallic wires;
   a robotic manipulator configured to move from the first container to the second container; and
   a Lidar sensor coupled to the robotic manipulator and configured to sense an item protruding out of the first container.

2. The item sortation system of claim 1, further comprising:
   a controller configured to:
      determine, using data from the Lidar sensor, that a first item is protruding out of the first container;
      cause the first container to be automatically removed from the item sortation system and transported to a shaking table for settling of the first item;
      determine, using data from the Lidar sensor, that an item is not protruding out of the second container; and
      cause the second container to be automatically removed from the item sortation system and transported to a downstream processing station.

3. The item sortation system of claim 1, wherein the round metallic wires that form the first mesh grid and the second mesh grid form a pattern of squares having a width of about 1 inch.

4. The item sortation system of claim 1, wherein the round metallic wires have a diameter of about 4 millimeters.

5. A system for use with an item sortation machine comprising:
   a rotatable flap comprising a mesh grid coupled to a frame, wherein the rotatable flap is disposed adjacent to a container of items in the item sortation machine; and
   a sensor positioned to sense an item protruding out of the container;
   wherein the mesh grid comprises a set of wires that intersect to form the mesh grid.

6. The system of claim 5, further comprising:
   a controller configured to:
      determine, using data from the sensor, that the item is protruding out of the container; and
      cause the container to be automatically removed from the item sortation machine and transported to a shaking table for settling of the item.

7. The system of claim 5, further comprising:
   a controller configured to:
      determine, using data from the sensor, that the item is not protruding out of the container; and
      cause the container to be automatically removed from the item sortation machine and transported to a downstream processing station.

8. The system of claim 5, wherein the sensor is coupled to a robotic manipulator and is configured to move from a first location to a second location.

9. The system of claim 5, wherein the set of wires comprises individual metallic wires having a diameter between about 3 millimeters and about 5 millimeters.

10. The system of claim 5, wherein the set of wires comprises individual rounded metallic wires.

11. The system of claim 5, wherein the mesh grid is a pattern of squares having a width of between about 1 inch and about 2 inches.

12. The system of claim 5, wherein the rotatable flap is a first rotatable flap, and wherein the system further comprises:
   a second rotatable flap comprising the mesh grid, such that the first rotatable flap and the second rotatable flap together form a faraday shield that prevents electromagnetic interference with the item sortation machine.

13. The system of claim 5, wherein the rotatable flap is configured to rotate towards the item sortation machine and away from the item sortation machine to facilitate access to the container.

14. The system of claim 5, wherein the rotatable flap is configured to slide in a vertical direction relative to the container.

15. The system of claim 5, wherein the frame is a metallic frame.

16. An item sortation system comprising:
   a rotatable flap comprising a mesh grid coupled to a frame, wherein the rotatable flap is disposed adjacent to a container of items in the item sortation machine;
   a robotic manipulator; and
   a sensor coupled to the robotic manipulator, wherein the sensor is configured to sense an item protruding out of the container;
   wherein the mesh grid comprises a set of wires that intersect to form the mesh grid, and wherein the set of wires form a geometric pattern.

17. The item sortation system of claim 16, further comprising:
   a controller configured to:
      determine, using data from the sensor, that the item is protruding out of the container; and
      cause the container to be automatically removed from the item sortation machine and transported to a shaking table for settling of the item.

18. The item sortation system of claim 16, wherein the set of wires comprises individual rounded metallic wires having a diameter between about 3 millimeters and about 5 millimeters.

19. The item sortation system of claim 16, wherein the geometric pattern is a pattern of squares having a width of about 1 inch.

20. The item sortation system of claim 16, wherein the rotatable flap is a first rotatable flap, and wherein the system further comprises:
a second rotatable flap comprising the mesh grid, such that the first rotatable flap and the second rotatable flap together form a faraday shield that prevents electromagnetic interference with the item sortation machine.

* * * * *